(12) United States Patent
Wu et al.

(10) Patent No.: US 11,195,326 B2
(45) Date of Patent: Dec. 7, 2021

(54) METHOD AND SYSTEM FOR DEPTH PRE-PROCESSING AND GEOMETRY SORTING USING BINNING HARDWARE

(71) Applicant: Advanced Micro Devices, Inc., Santa Clara, CA (US)

(72) Inventors: Ruijin Wu, La Jolla, CA (US); Young In Yeo, La Jolla, CA (US); Sagar S. Bhandare, La Jolla, CA (US); Vineet Goel, La Jolla, CA (US); Martin G. Sarov, La Jolla, CA (US); Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/137,830

(22) Filed: Sep. 21, 2018

(65) Prior Publication Data
US 2020/0098169 A1  Mar. 26, 2020

(51) Int. Cl.
*G06T 15/80* (2011.01)
*G06T 1/20* (2006.01)
*G06T 15/00* (2011.01)

(52) U.S. Cl.
CPC ............... *G06T 15/80* (2013.01); *G06T 1/20* (2013.01); *G06T 15/005* (2013.01)

(58) Field of Classification Search
CPC .......... G06T 15/80; G06T 1/20; G06T 15/005
See application file for complete search history.

(56) References Cited

U.S. PATENT DOCUMENTS

| | | | |
|---|---|---|---|
| 2012/0213450 A1* | 8/2012 | Shirley | G06T 5/20 382/260 |
| 2013/0241938 A1* | 9/2013 | Gruber | G06T 11/40 345/501 |
| 2014/0118347 A1* | 5/2014 | Hakura | G06T 15/503 345/422 |
| 2014/0267256 A1* | 9/2014 | Heggelund | G06T 15/40 345/421 |
| 2014/0292756 A1 | 10/2014 | Mantor et al. | |
| 2016/0171756 A1* | 6/2016 | Akenine-Moller | G06T 15/005 |
| 2016/0350966 A1* | 12/2016 | Nilsson | G06T 11/40 |
| 2016/0371873 A1 | 12/2016 | Mantor et al. | |

\* cited by examiner

*Primary Examiner* — Chong Wu
(74) *Attorney, Agent, or Firm* — Volpe Koenig

(57) ABSTRACT

Described herein are techniques for improving the effectiveness of depth culling. In a first technique, a binner is used to sort primitives into depth bins. Each depth bin covers a range of depths. The binner transmits the depth bins to the screen space pipeline for processing in near-to-far order. Processing the near bins first results in the depth buffer being updated, allowing fragments for the primitives in the farther bins to be culled more aggressively than if the depth binning did not occur. In a second technique, a buffer is used to initiate two-pass processing through the screen space pipeline. In the first pass, primitives are sent down to update the depth block and are then culled. The fragments are processed normally in the second pass, with the benefit of the updated depth values.

20 Claims, 8 Drawing Sheets

METHOD AND SYSTEM FOR DEPTH PRE-PROCESSING AND GEOMETRY SORTING USING BINNING HARDWARE

BACKGROUND

Graphics processing pipelines include a number of stages, including a pixel shader stage. Pixel shader workload is usually the most expensive task in modern graphics applications. Depending on the order that pixels are processed in, sometimes the shader output for a particular pixel can be completely overridden by the pixel shader output for a later pixel. This redundant pixel shader workload is called pixel overdraw. Pixel overdraw will cause extra power to be consumed and will lower performance while not improving final rendering quality. Improvements to reduce pixel overdraw are desirable and constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for improving the effectiveness of depth culling for the purpose of reducing overdraw. In a first technique, a binner is used to sort primitives into depth bins. Each depth bin covers a range of depths. The binner transmits the depth bins to the screen space pipeline (which includes the pixel shader) for processing in near-to-far order. Processing the near bins first results in the depth buffer being updated to reflect the depth data for the primitives of the near bins. This allows fragments for the primitives in the farther bins to be culled more aggressively than if the depth binning did not occur.

In a second technique, a buffer, optionally in the binner, is used to initiate two-pass processing through the screen space pipeline. In the first pass, primitives are sent down simply for the purpose of updating the depth values in the depth block. In this first pass, the fragments generated for the primitives are culled once the depth values are updated, and these fragments are thus not processed in the pixel shader stage for the first pass. The fragments are processed normally in the second pass, with the benefit of the updated depth values.

Figure 1:
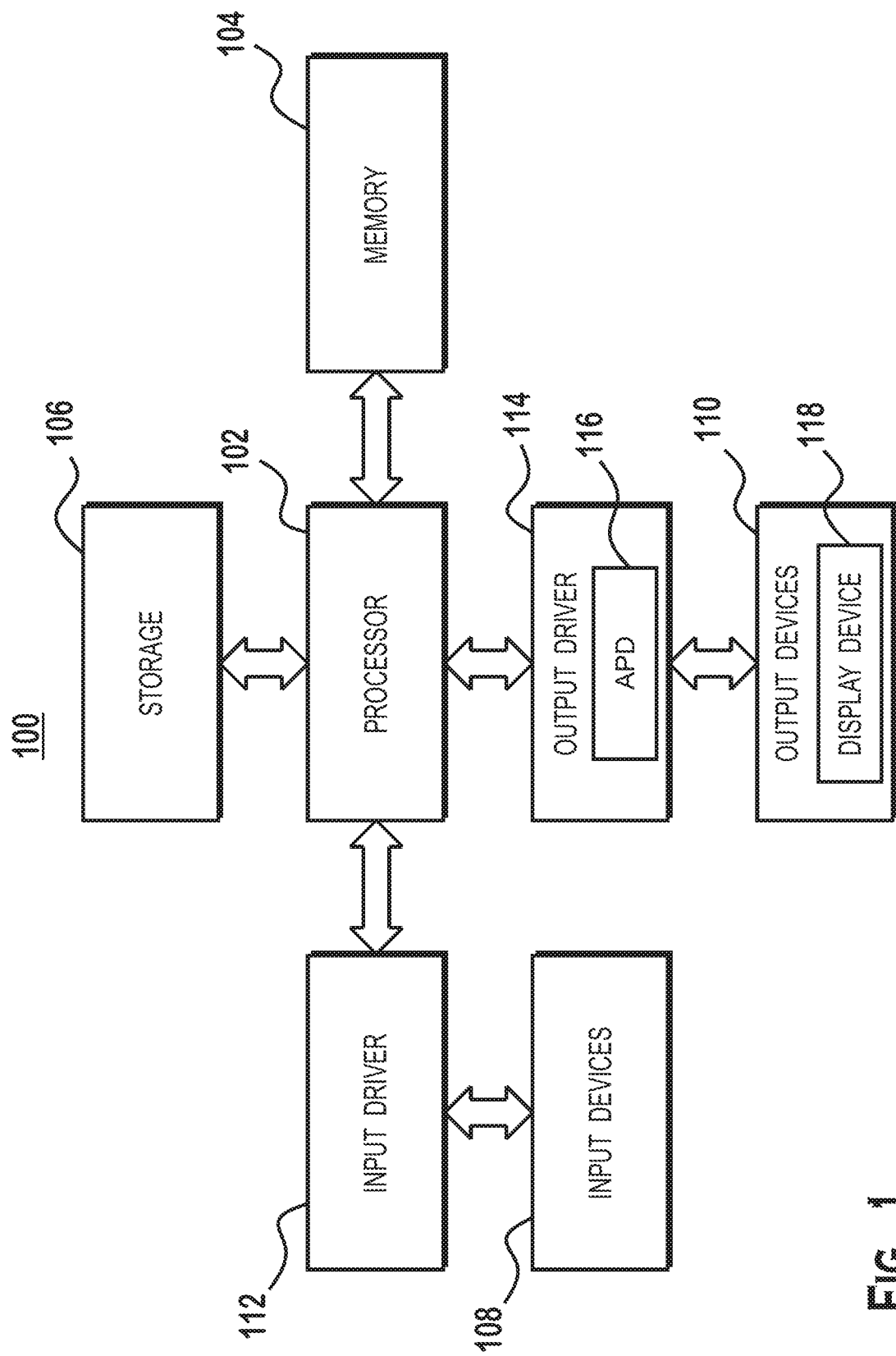
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
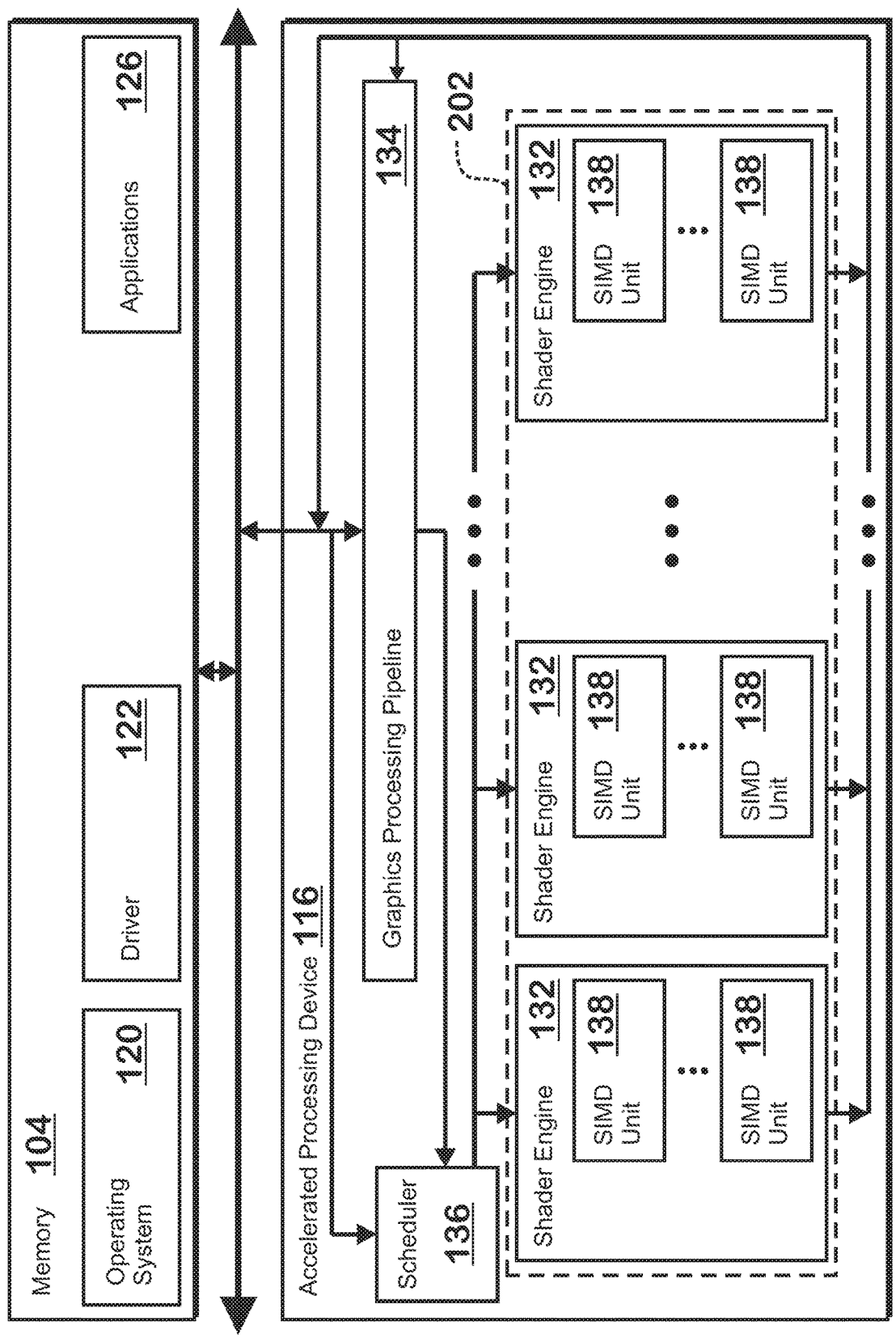
FIG. 2 is a block diagram of the device, illustrating additional details related to execution of processing tasks on the APD 116, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126.

These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
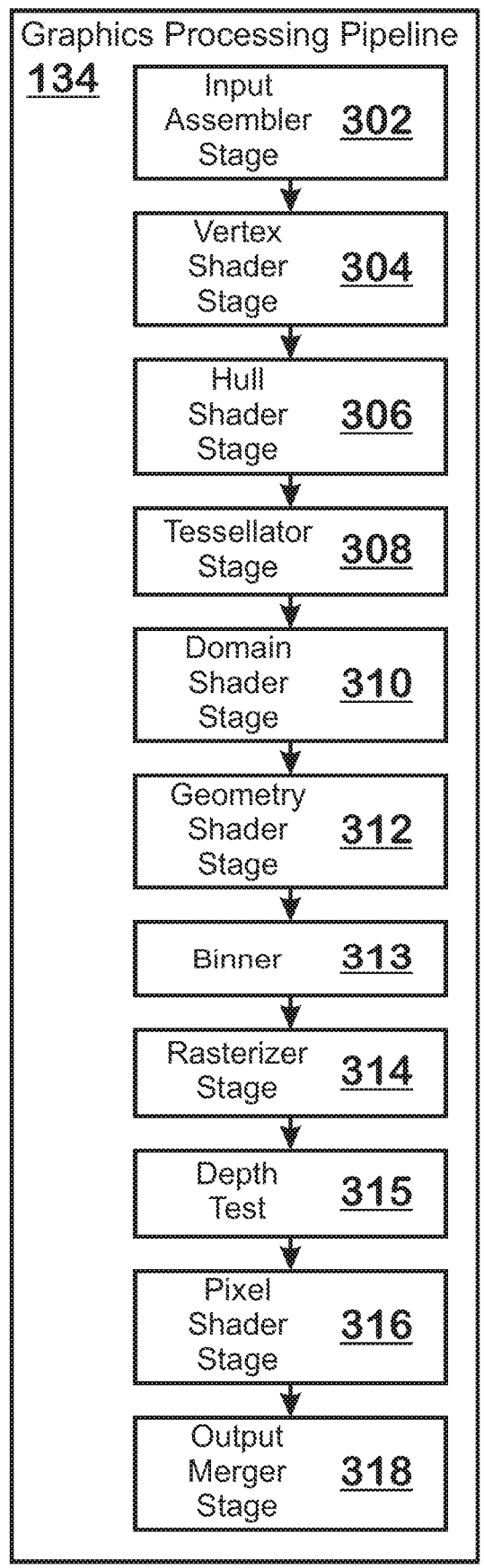
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, and/or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a shader program that executes on the programmable processing units 202 performs operations for the geometry shader stage 312.

The binner 313 accepts primitives from the world-space pipeline (which includes the vertex shader stage 304, the hull shader stage 306, the tessellator stage 308, the domain shader stage 310, and the geometry shader stage 312, and may include other units). The binner 313 assigns each primitive to one or more "bins." A bin is a particular subdivision of screen space as well as a collection of primitives and pixel data that are determined by the binner 313 to overlap that subdivision of screen space. For instance, one bin might encompass the top-left corner of screen space (for example, the top left 64×64 pixels of screen space). In operation, the binner 313 fills a buffer designated to store data for a particular bin until a particular trigger condition (such as the binner being full or the binner 313 being instructed explicitly by another unit to "flush" the buffer) is met and then transmits the data for that bin to the rasterizer stage 314 for processing and forwarding to the rest of the stages.

The purpose of binning is to allow later units in the graphics processing pipeline 134 to process pixel data in a "focused" manner, in terms of the portion of the screen that is processed at any given time. This "focusing" aims to reduce the amount of working data that is to be maintained during any particular portion of processing, which allows caches or buffers to be smaller and/or to be more efficiently used (e.g., by having higher hit rates, or the like). For example, by sending data associated with the top left corner of a screen before sending any other data, buffers and caches that store data will have data only for that top left corner of the screen. This would allow for such buffers or caches to be smaller and/or to have a higher hit rate. Additional details regarding binner operations are provided in U.S. patent application Ser. No. 13/853,422, filed on Mar. 29, 2013, and entitled "Hybrid Render with Deferred Primitive Batch Binning," and in U.S. patent application Ser. No. 15/250,357, filed on Aug. 29, 2016, and entitled "Hybrid Render with Preferred Primitive Batch Binning and Sorting," both of which are incorporated herein by reference in their entirety. An example of operation of the binner 313 is provided below with respect to FIG. 4.

The rasterizer stage 314 accepts and rasterizes simple primitives and generated upstream. Rasterization consists of determining which screen pixels (or sub-pixel samples) are covered by a particular primitive. The rasterizer generates fragments for the covered pixels or sub-pixel samples and sends the fragments to the remainder of the pipeline for rendering. Fragments are in-flight pixel data that indicate how to draw the final scene. Fragments including information such as color and depth information for a particular pixel position. The color information is used to determine the final color value for the pixel in the frame image. Some fragments may not contribute to the final image, for example, if a particular fragment is occluded by another fragment based on a comparison of depth values. Rasterization is performed by fixed function hardware.

A depth test block 315 performs a depth test on fragments output by the rasterizer stage 314. To perform the depth test, the depth test block 315 compares the depth values of fragments against depth values in a depth buffer. If the comparison indicates that a fragment is occluded (e.g., due to the value in the depth buffer indicating that a fragment closer to the camera has already been processed), then the depth test block 315 culls the fragment, which results in processing of that fragment being terminated. For example, culled fragments are not processed by stages subsequent to the depth test 315, such as the pixel shader stage 316 and the output merger stage 318. If the comparison indicates that a fragment is not occluded, then the depth test block 315 does not cull the fragment, and allows the fragment to continue processing in the rest of the graphics processing pipeline 314. In some modes of operation, determining that a fragment is not occluded also causes the depth test block 315 to update the corresponding depth value in the depth buffer as the depth value of the not-occluded fragment. In an example, since the fragment is not occluded, the fragment must be the closest fragment seen until that point in time. Thus the new value for comparison against future fragments is the fragment of this most-recently-seen, closest fragment. Depth testing is also referred to as depth culling herein.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing (also "depth testing") and alpha blending to determine the final color for a screen pixel.

Figure 4:
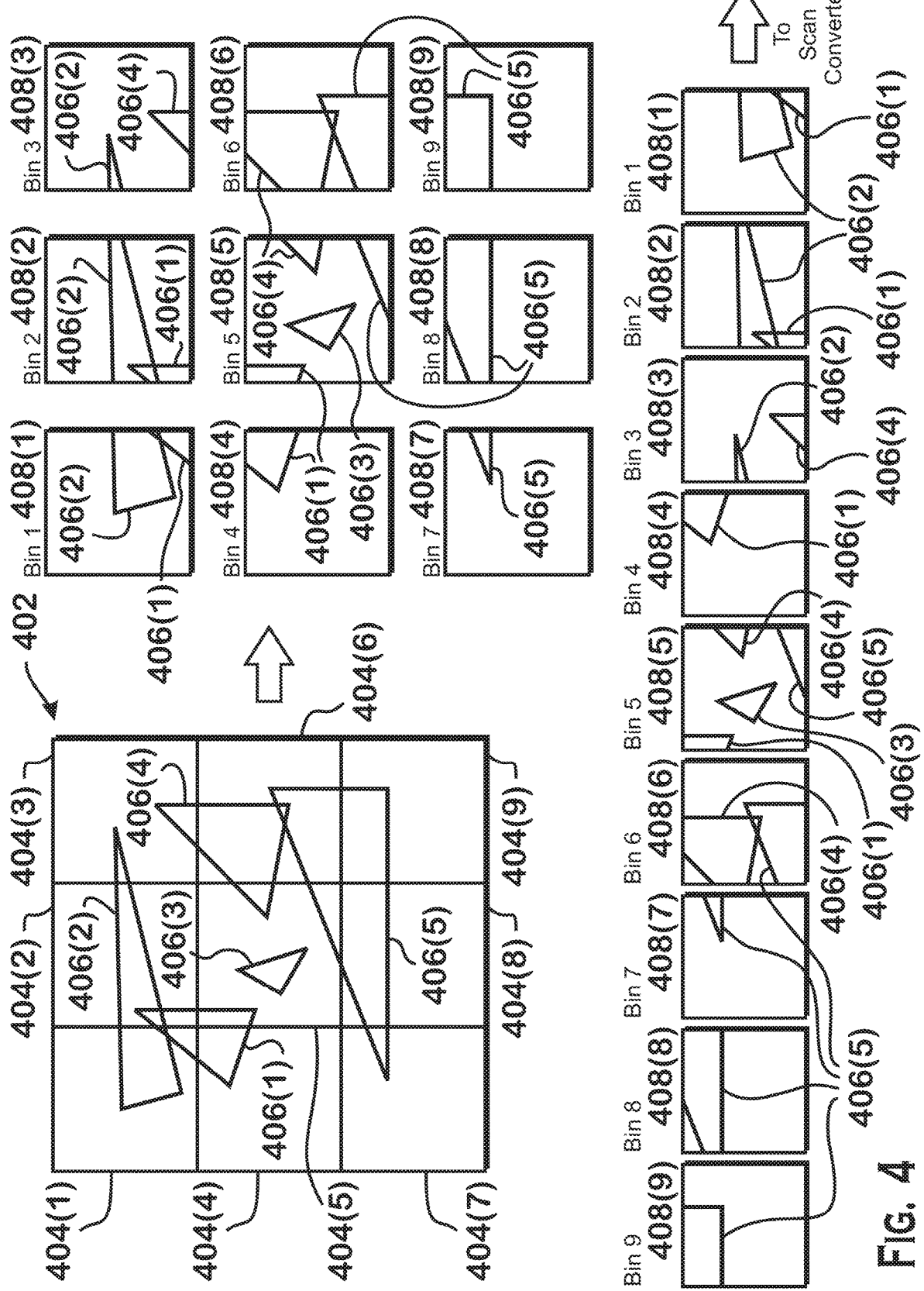
FIG. 4 is an illustration of operations performed by the binner of FIG. 3, according to an example.

FIG. 4 is an illustration of operations performed by the binner 313 of FIG. 3, according to an example. A screen-space 402 is illustrated, divided into several screen-space subdivisions 404. The screen-space 402 represents a geometric area in which pixels can be rendered for eventual output to a display device 118 (or for writing to some render target other than one that will be output to the display device 118). Each screen-space subdivision 404 is a spatially distinct portion of the screen-space 402.

FIG. 4 illustrates five different primitives 406 received from the world-space pipeline. The different primitives 406 cover different screen-space subdivisions 404. The first primitive 406(1) covers screen-space subdivision 404(1), screen-space subdivision 404(2), screen-space subdivision 404(4), and screen-space subdivision 404(5). The second primitive 406(2) covers screen-space subdivision 404(1), screen-space subdivision 404(2), and screen-space subdivision 404(3). The third primitive 406(3) covers screen-space subdivision 404(5). The fourth primitive 406(4) covers screen-space subdivision 404(3), screen-space subdivision 404(5), and screen-space subdivision 404(6). The fifth primitive 406(5) covers screen-space subdivision 404(5), screen-space subdivision 404(6), screen-space subdivision 404(7), screen-space subdivision 404(8), and screen-space subdivision 404(9).

The binner 313 generates bins 1-9 (including bin 1 408(1), bin 2 408(2), and so on, through bin 9 408(9)). Each bin 408 includes the primitives 406 that cover the screen-space subdivision 404 associated with that particular bin. The bins 408 are transmitted in order to the remainder of the graphics processing pipeline 134 for processing. The specific order depicted is left to right and row, by row, although the order in which bins 408 are transmitted for processing can be any technically feasible order.

Although the primitives 406 are illustrated in FIG. 4 as being "cut off" by the boundary of the associated screen-space subdivision 404, whole primitives are included in each particular bin. A clipping rectangle, aligned with the borders of the associated screen-space subdivision 404, is transmitted with each bin 408 to the remainder of the graphics processing pipeline 134 so that the remainder of the graphics processing pipeline 134 knows to process data for fragments within the screen-space subdivision 404 but not outside. The borders of the clipping rectangle can be modified for various operations that might require such modifications, such as anti-aliasing that uses data from adjacent pixels, or other operations.

The bins 408, along with the clipping rectangles, are processed by the remainder of the graphics processing pipeline 134 to render the primitives into pixels in bin-order. For example, the rasterizer stage 314 rasterizes primitives for the first bin 408(1), primitives for the second bin 408(2), primitives for the third bin 408(3), and so on. As described above, rasterization involves identifying screen positions that are covered by a particular primitive. The clipping rectangle restricts the identified screen positions to only those included within the screen-space subdivision 404 associated with a particular bin 408. Thus, the output of the rasterizer stage 314 for a particular bin 408 includes, for each primitive 406 in the bin 408, the fragments that are in the screen-space subdivision 404 associated with the bin 408 and are covered by that primitive 406. The output of the pixel shader stage 316 for a particular bin 408 includes, for each primitive 406, shaded fragments that cover that primitive 406 and are within the screen-space subdivision 404 associated with that bin 408.

The binner 313 can be used to improve the effectiveness of depth culling. The more fragments that depth culling culls, the more effective depth culling is, because the amount of work required to be done downstream in the pipeline is reduced (i.e., overdraw is reduced). More fragments are culled if the depth test block 315 encounters more-occluding fragments earlier than less-occluding fragments. In an example, fragments that are sorted from closest to most distant will result in a much greater number of fragments culled than if fragments were sorted from most distant to closest. With fragments sorted from closest to most distant, the earliest fragments will update the depth values in the depth buffer to the closest values. Subsequent fragments, which are further away, will be culled due to the contents of the depth buffer. With fragments sorted from most distant to closest, no fragments will be culled because no subsequent fragment will be occluded by any prior fragment.

Figure 5:
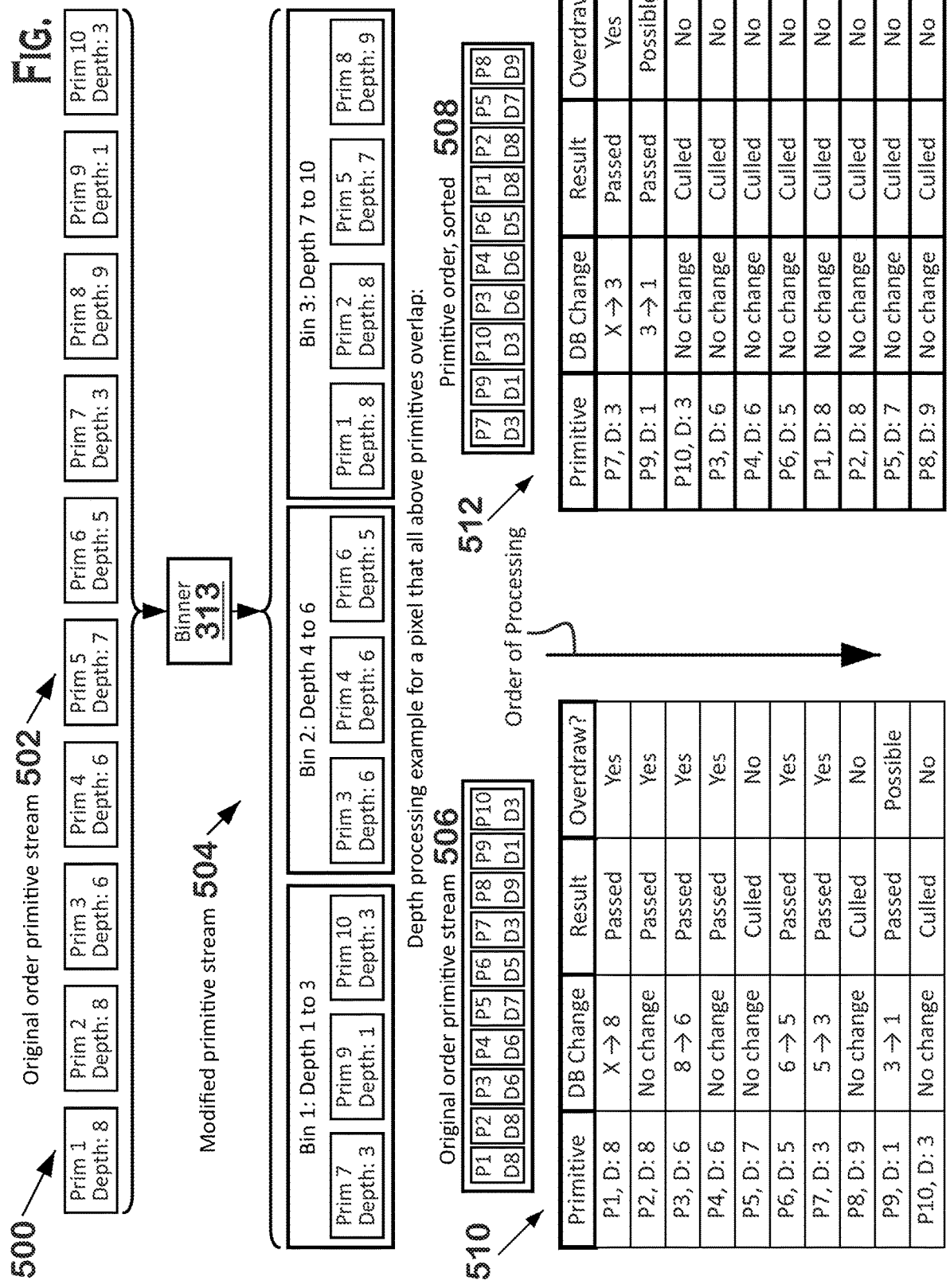
FIGS. 5 and 6 illustrate an example technique for improving the effectiveness of depth culling by performing a depth-binning operation.
Figure 6:
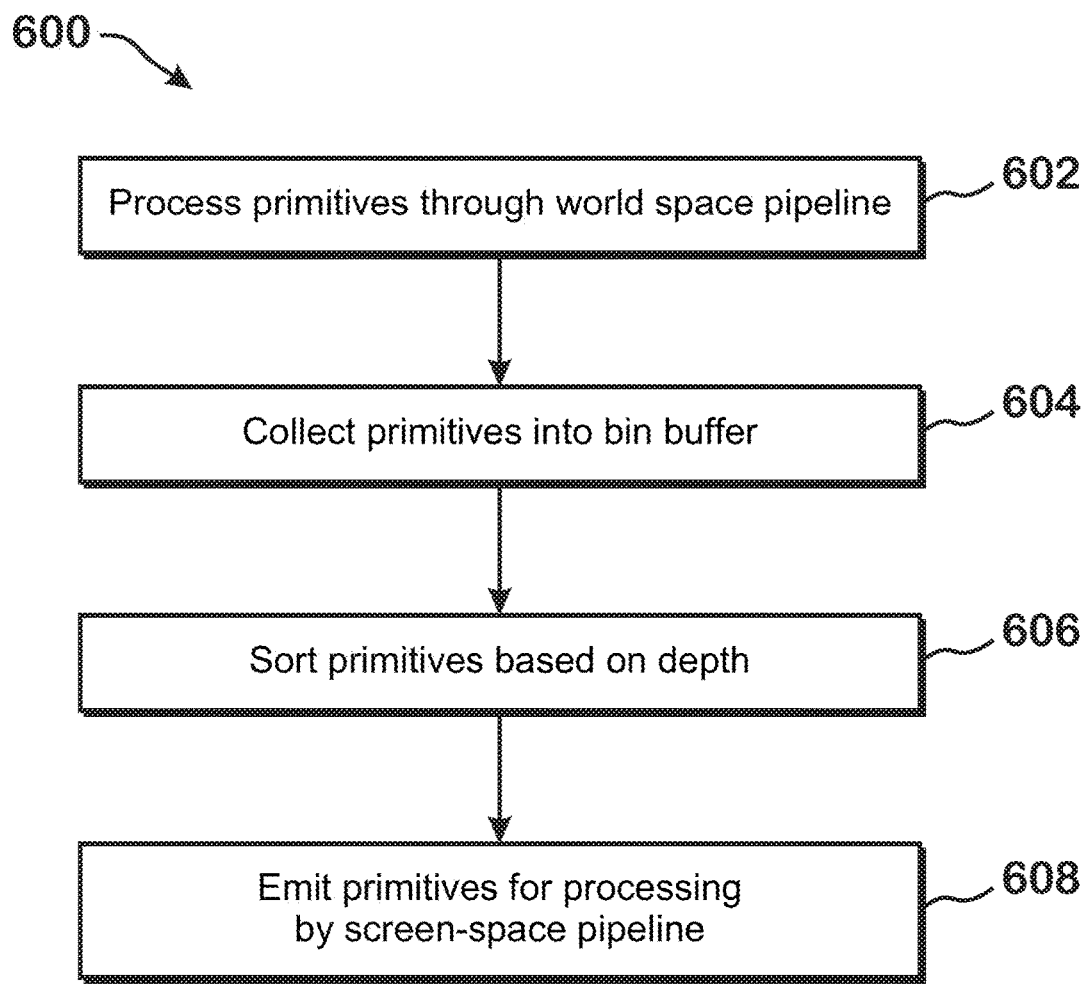

FIGS. 5 and 6 illustrate an example technique for improving the effectiveness of depth culling by performing a depth-binning operation. FIG. 5 is a diagram illustrating an example of such an operation. Specifically, FIG. 5 illustrates a set of binning operations 500, chart 510, and chart 512 that illustrate the results of those binning operations, according to an example. FIG. 6 is a flow diagram of a method 600 for performing a depth-binning operation, according to an example. Although the method 600 of FIG. 6 is described with respect to the system of FIGS. 1-4, it should be understood that any system configured to perform the method 600 in any technically feasible order falls under the scope of the present disclosure. FIGS. 5 and 6 will now be discussed together.

The method 600 begins at step 602, where the graphics processing pipeline 134 processes a set of primitives through the world space pipeline (which, as described above, includes the vertex shader stage 304, hull shader stage 306, tessellator stage 308, domain shader stage 310, and geometry shader stage 312, as well as other elements not illustrated in FIG. 3). This processing is done as described above, with respect to, for example, FIG. 3.

At step 604, the binner 313 collects primitives into a buffer. The purpose of the buffer is to hold primitives for the operations performed by the binner 313. In the example of FIG. 5, the primitives collected into the buffer are the "original order" (i.e., not-yet-binned) primitive stream 502.

At step 606, the binner 313 sorts the primitives collected into the buffer based on depth. This sorting operation includes assigning different primitives of the primitive stream to depth-bins. Each depth bin has a range of depths that determines which primitives can be assigned to that bin. In some implementations, the depth of a primitive is the depth of the closest vertex of the primitive. Thus, a primitive is assigned to a bin by identifying the range of depths that the closest vertex of the primitive falls within. For example, if the closest vertex of a primitive has a depth of 5 and a particular bin has a depth range of 4-6, then the binner 313 determines that primitive is to be assigned to that bin.

In the example of FIG. 5, each depth-bin has a range of depth values. Bin 1 has the range of 1 to 3. Bin 2 has the range of 4 to 6. Bin 3 has the range of 7 to 10. It should be noted that a lower depth value means closer to the camera. Thus a fragment with a lower depth value occludes a fragment with a higher depth value at the same screen position.

To perform step 606, the binner 313 stores the primitives of the primitive stream 502 into different bins. The binner 313 places primitives 7, 9, and 10, which have depths 3, 1, and 3, respectively, into bin 1, which covers depths 1 to 3. The binner 313 places primitives 3, 4, and 6, which have depths 6, 6, and 5, respectively, into bin 2, which covers depths 4 to 6. The binner 313 places primitives 1, 2, 5, and 8, which have depths 8, 8, 7, and 9 respectively, into bin 3, which covers depths 7 to 10. The modified primitive stream 504, which shows the sorted primitives, is illustrated in FIG. 5.

At step 608, the binner 313 emits primitives for processing by the screen-space pipeline (which includes the rasterizer stage 314, depth test stage 315, pixel shader stage 316, and output merger stage 318). The binner 313 emits these primitives in depth order, starting with the closest bin and ending with the farthest bin. Within each bin, the primitives are not necessarily sorted by depth, although in some implementations, primitives within each bin are sorted by depth.

FIG. 5 illustrates an example of processing in the screen-space pipeline. Chart 510 illustrates the results of processing the original order primitive stream 502. Chart 512 illustrates the results of processing the modified primitive stream 504 (the primitives as reordered by the binner 313). It should be understood that according to the technique of FIG. 6, the original order primitive stream 502 is not processed in the screen space pipeline. The results of that processing, however, are shown simply for comparative illustration, to show the benefits of the technique of FIG. 6. It should also be understood that the results illustrated in chart 510 and chart 512 are for a single, example screen pixel. It should also be understood that each of the primitives described overlaps this example screen pixel. Thus the depth values described are for that screen pixel position. In normal operation, however, primitives could overlap multiple screen pixels and thus the depth operations described herein would be performed for a variety of different screen pixel positions.

Processing the original order primitive stream 502 occurs as follows. All the primitives are rasterized and experience processing in the depth test block 315. Note that because this discussion is only for a single screen pixel position, and because the rasterizer stage 314 produces fragments from primitives, the description of the operations related to chart 510 and chart 512 may refer to depth testing and other operations being performed for "fragments." Also, for the sake of simplicity, it is assumed that each primitive is exactly parallel to the near and far plane of the viewing frustum, so that the depth at each point in any particular primitive is the same. However, in normal operations, this of course may not be true.

The fragment for the first primitive, primitive 1 is processed in the depth block, which updates its stored depth value to that of the fragment for primitive 1 (depth value 8). The "X" indicates that some depth value is stored in the depth block prior to processing the original order primitive stream 502 that is greater than the depth for any of the primitives in that stream. The depth test block 315 also passes (does not cull and allows the screen-space pipeline to process) primitive p1, since that primitive is closer than the depth the X value represents. This passing results in overdraw because this fragment will be drawn over by future fragments as described below.

The fragment for the second primitive has the same depth as the fragment for the first primitive (depth 8). Thus, the fragment for the second primitive is passed but also results in overdraw. The fragment for the third primitive has a depth (6) that is lower than the depth (8) stored by the depth test block 315. Thus, that value is updated and the fragment is passed. Overdraw occurs because later fragments will overdraw that fragment. The fragment for primitive 4 has a depth of 6, which is equal to that stored by the depth test block 315. Thus that fragment is passed. There is no update to the depth value stored in the depth test block 315, since the depth value stored therein is the same as the depth value for the fragment of primitive 4. Overdraw occurs because later fragments will overwrite the fragment for primitive 4. The fragment for primitive 5 has a depth value (7) that is greater than that stored in the depth test block 315 (6). Thus that fragment is culled. Because of this culling, there is no overdraw. The fragment for primitive 6 has a depth value of 5. Thus, the value stored in the depth test block 315 is updated and the fragment is passed. Overdraw occurs because a future fragment will overwrite this fragment. The fragment for primitive 7 also results in the depth value of the depth test block 315 being updated, from 5 to 3, and results in the fragment being passed. This fragment, too results in overdraw. The fragment for primitive 8 is not passed, since that fragment has a depth that is greater than that stored in the depth test block 315. Therefore, the fragment is culled and no overdraw occurs. The fragment for primitive 9, having depth of 1, causes the depth value for the depth test block 315 to be updated. That fragment is passed. The chart 510 states that overdraw is "possible," because primitives after the primitive stream 502, which are not shown, may overwrite that screen position. The fragment for primitive 10 has a higher depth value than that stored in the depth test block 315. Thus, that fragment is culled and no overdraw occurs. As can be seen, there is a lot of overdraw that occurs for the original order primitive stream 502.

The chart 512 illustrates the depth-buffer operations for the modified primitive stream 504, sorted by the binner 313. The fragment for primitive 7, having depth 3, is passed, and causes the depth value for the depth test block 315 to be updated to 3. This fragment is overdrawn by the next fragment, that for primitive 9, having depth 1. This primitive 9 fragment causes the depth test block 315 depth value to be updated to 1. Overdraw is "possible" by primitives subsequent to the modified primitive stream 504. All subsequent fragments in the modified primitive stream 504 are culled due to having depth values higher than that stored in the depth test block 315. No overdraw occurs for those culled fragments. As can be seen, depth-binning of the primitives greatly reduces the amount of overdraw that occurs.

In some implementations, the technique of FIGS. 5-6 (the depth-sorting technique) is used in conjunction with the spatial binning technique of FIG. 4. In an example, the binner 313 accepts primitives into its buffer and sorts those primitives spatially into different spatial bins as shown in FIG. 4. Then the binner 313 sorts each spatial bin in a depth-wise manner as described with respect to FIGS. 5-6. In another example, the binner 313 sorts primitives in its buffer in a depth-wise manner first and then sorts the primitives spatially.

The depth sorting technique of FIGS. 5-6 changes the order with which primitives are rendered in the screen-space pipeline. This order change is satisfactory as long as the rendering results are not affected. If blending is enabled (e.g., if alpha blending is enabled in the output merger stage 318, according to which fragments from two or more different primitives can contribute to the color of a single pixel), then the depth sorting technique of FIGS. 5-6 is not used. This is because the order of primitives may affect the final appearance of the rendered frame. If any other feature that depends on primitive processing order (such as unordered access view (or "UAV")) is enabled, the technique of FIGS. 5-6 is not used.

Figure 7:
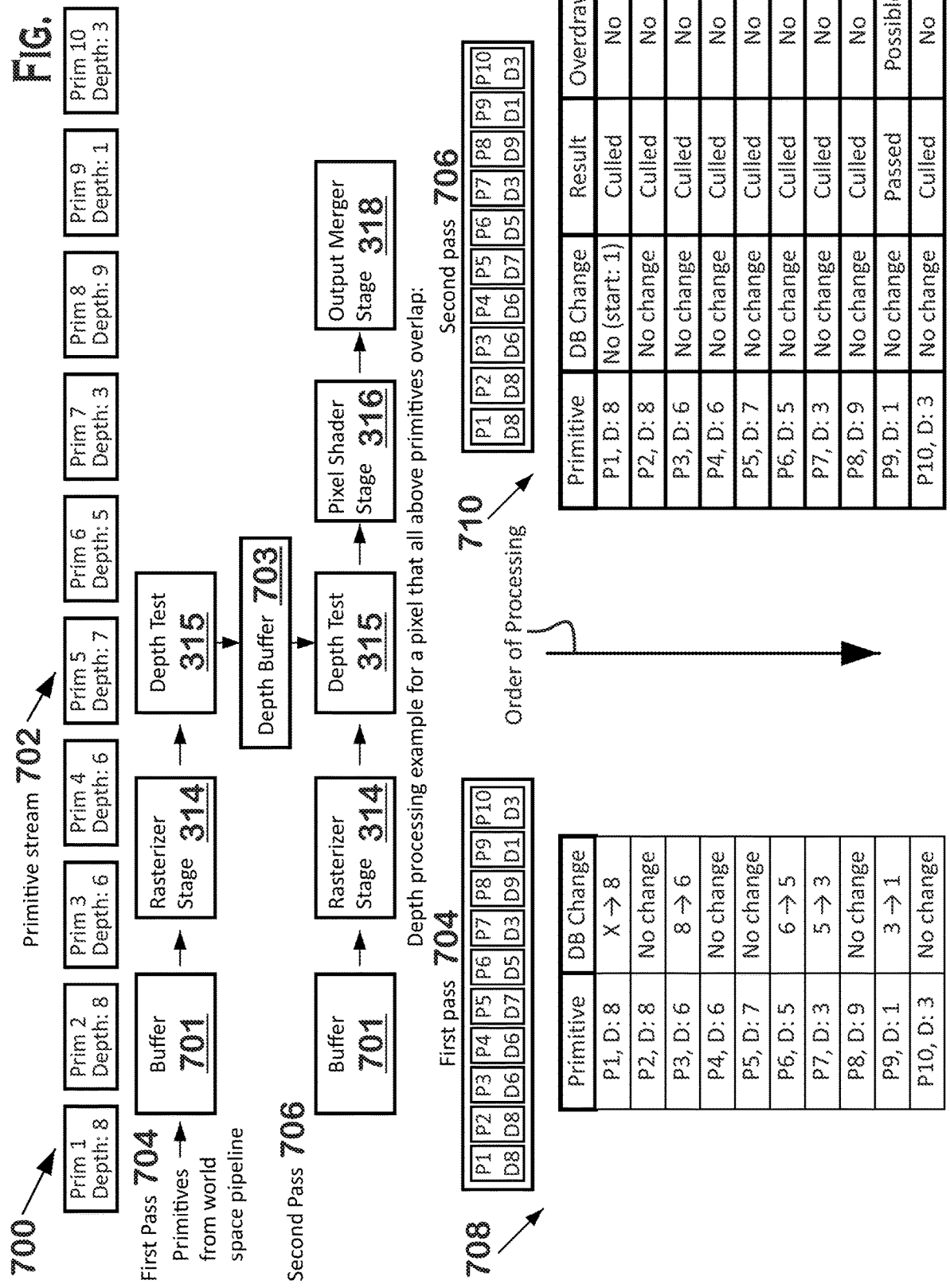
FIGS. 7 and 8 illustrate another example technique for improving the effectiveness of depth culling by performing a two-pass rendering operation.
Figure 8:
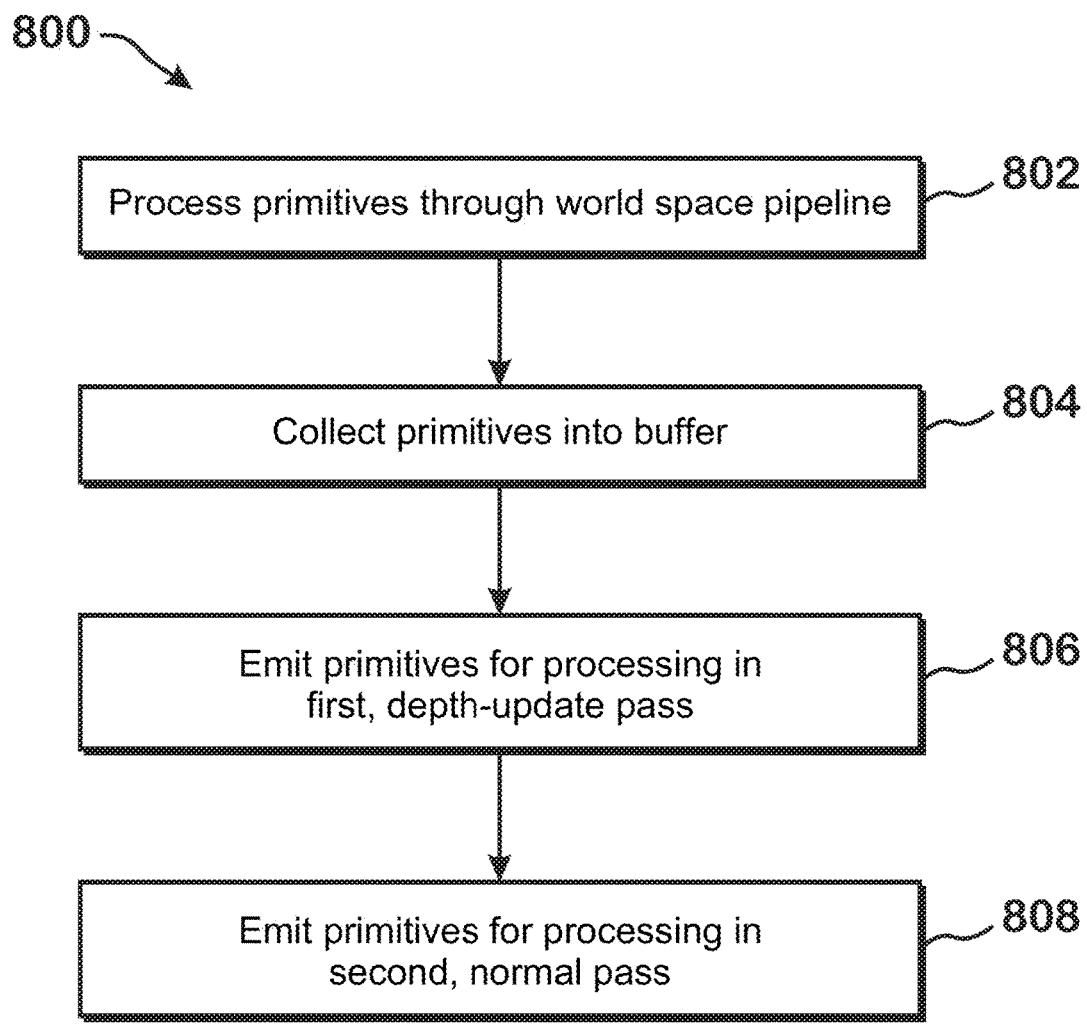

FIGS. 7 and 8 illustrate another example technique for improving the effectiveness of depth culling by performing a two-pass rendering operation. FIG. 7 is a diagram illustrating an example of such an operation. Specifically, FIG. 7 illustrates a set of double-pass operations, chart 708, and chart 710 that illustrate the results of those double-pass operations. FIG. 8 is a flow diagram of a method 800 for performing depth operations according to a two-pass technique, according to an example. Although the method 800 of FIG. 8 is described with respect to the system of FIGS. 1-4, it should be understood that any system configured to perform the method 800 in any technically feasible order falls under the scope of the present disclosure. FIGS. 7 and 8 will now be discussed together.

The method 800 begins at step 802, where the graphics processing pipeline 134 processes a set of primitives through the world space pipeline (which, as described above, includes the vertex shader stage 304, hull shader stage 306, tessellator stage 308, domain shader stage 310, and geometry shader stage 312, as well as other elements not illustrated in FIG. 3). This processing is done as is generally known.

At step 804, the graphics processing pipeline 134 collects primitives into a buffer 701. In some implementations, this buffer 701 is a buffer that is assigned to the binner 313 (e.g., the buffer used to store primitives for sorting according to the technique of FIG. 4), and the binner performs the two-pass related operations described herein (i.e., sending primitives down in a first pass and then in a second pass). In other implementations, the buffer 701 is not associated with the binner 313, and is instead a different buffer.

At step 806, the buffer 701 emits primitives for a first pass used to update the depth values stored in the depth buffer 703. This first pass 704 is shown in FIG. 7. In this first pass, the buffer 701 has received the primitives from the world space pipeline and emits the primitives to the rasterizer stage 314. The rasterizer stage 314 emits fragments for the primitives to the depth test block 315, which uses these fragments to update the depth buffer 703. This updating is done as follows. When a fragment is received, the depth test block 315 tests the entry in the depth buffer 703 corresponding to the screen position of that fragment. If the depth stored for that screen position is closer than or equal to that of the fragment, then the fragment is discarded without updates to the depth buffer 703. If the depth stored for that screen position is farther than that of the fragment, then the depth stored for that screen position is updated to be equal to the depth of the fragment. The fragment is discarded because fragments do not proceed past the depth test block 315 in the first pass 704.

At step 808, the buffer 701 emits the primitives in a second, normal pass. This second pass is generally identical to a "normal" pass through the screen-space pipeline, except that the depth buffer 703 now holds the depth values for the fragments about to be sent through the screen-space pipeline. This means that the depth test block 315 is able to more aggressively cull fragments because the depth test block 315 "knows" which fragments are going to be occluded by future fragments in the primitive stream 702.

An example of the two-pass technique is illustrated by graph 708 (first pass) and graph 710 (second pass). In the first pass, the primitives are processed through the rasterizer stage 314, which generates fragments. As with the example of FIG. 5, in the example of FIG. 7, depth values and fragments for only one screen position are shown for simplicity. However, it should be understood that similar operations would be performed for other screen positions. Moreover, it is assumed that all of primitives 1-10 cover at least one common pixel position.

In the first pass, the fragments trigger depth buffer updates. The fragment for primitive 1 causes the depth buffer to be updated to depth 8. The fragment for primitive 2 causes no depth buffer change because the depth of that fragment is the same as that stored in the depth buffer. The fragment for primitive 3 causes the depth buffer value to change to 6 because the fragment is closer to the camera than the value stored in the depth buffer. The fragments for primitives 4 and 5 cause no changes to the value stored in the depth buffer because those fragments are the same as (primitive 4, depth 6) the value in the depth buffer 703 or farther than (primitive 5, depth 7) the value in the depth buffer 703. The fragment for primitive 6, having depth 5, causes the depth buffer 703 to update its stored value to 5. The fragment for primitive 7, having depth 3, causes the depth buffer 703 to update its stored value to 3. The fragment for primitive 8, having depth 9, causes no change, as that depth is farther than the depth stored in the depth buffer 703. The fragment for primitive 9, having depth 1, causes a change of the depth buffer to have the same value. The fragment for primitive 10, having depth 3, causes no change in the depth buffer 703.

In the second pass 706, the fragments for the primitives are processed through the screen space pipeline again, but this time with the depth value in the depth buffer 703 at the closest of the fragments that were processed in the first pass. In this situation, all of the fragments except that for primitive 9, which has depth 1, are culled due to being farther from the camera than the value stored in the depth buffer 703. Because these fragments are culled, there is no overdraw for these fragments.

In some implementations, the second pass (step 808) is done in conjunction with the spatial binning performed by the binner 313 as described with respect to FIG. 4. More specifically, in the first pass, the binner 313 stores primitives in its buffer and transmits those primitives to the screen space pipeline for depth buffer updates. Then, for the second pass, the binner 313 sorts primitives it receives in its buffer spatially. The binner 313 then sends the spatial bins to the screen space pipeline in order.

In some implementations, no buffer in the APD 116 is used to facilitate performing the two-pass rendering of FIGS. 7-8. Instead, the two-pass rendering is orchestrated by a software component executing on the processor 102, such as the driver 122. In such implementations, the software component performs the first pass by sending geometry into the APD 116 for rendering in a mode in which the pixel shader stage 316 does not execute a pixel shader program. In such a situation, the depth test block 315 discards the fragments after the depth buffer is updated. In the second pass, the software component sends the same geometry as the first pass into the APD 116 for rendering with the pixel shader enabled.

In some modes of operation, the pixel shader stage 316 executes a pixel shader program having "cut-out" functionality (sometimes referred to as "cut-out shaders" herein). Cut-out functionality is functionality in which the pixel shader program, itself, causes certain specific fragments to be discarded. Often, the fragments are discarded according to a cut-out mask, for example to create geometry having "holes." With pixel shaders having cut-out functionality, the following two-pass technique is used.

In a first pass, the APD 116 renders a set of geometry with a reduced version of the pixel shader program, having instructions that discard fragments per the cut-out functionality, but not having instructions that modify other pixel attributes such as color. Further, in the first pass, the late-z depth block (a depth block after the pixel shader stage 316 which performs similar functionality to the depth test block 315 prior to the pixel shader stage 316, but after pixel shading is performed by the pixel shader stage 316), and not the early-z depth block, updates the depth buffer based on the depths of the fragments emitted by the pixel shader stage 316. The late-z depth block is used with cut-out shaders because if early-z (where "early-z" is the depth test block 315, which is before the pixel shader stage 316) were used, then the depth values of fragments that would be discarded by the cut-out shaders would update the depth buffer, which is not desirable.

In a second pass, the APD 116 renders the same geometry as with the first pass, but uses the following modifications. First, instead of using the reduced version of the pixel shader program used in the first pass, the APD 116 uses a full version of the pixel shader program, that does not include the cutout instructions to discard fragments (e.g., uses the pixel shader program as specified by the application, and including instructions that modify attributes such as color, but not including instructions to discard cutout fragments; although in some instances, some instructions that contribute to cutout may be included such as instructions that load data for textures that also happen to load cutout information). In addition, instead of late-z, early-z is used. Further, the depth test used is an "equals" depth test, according to which a fragment is passed if the depth of the fragment is equal to the depth value stored in the depth buffer for the screen position of the fragment, but fragments are not passed and are discarded if the depth of the fragment is not equal to the depth value stored in the depth buffer for the screen position of the fragment. An "equals" test is used because of the cut-out operations performed in the first pass. More specifically, at early-z, it is not yet known whether any particular fragment would be discarded due to the cut-out shader. For this reason, it would be possible for early-z to pass a fragment that would later be discarded by the cut-out shader if the "normal" closer-than-or-equal-to depth test were used. For example, if a triangle is the closest triangle in a particular area of the screen, and has a cut-out applied, then the cut-out fragments of that triangle would be passed to the pixel shader stage 316 if the normal test were used in early-z, even though those fragments would eventually be discarded by the cut-out shader. By using an "equals" depth test, it is ensured that only those fragments determined to be the closest fragments visible in the first pass (for the set of geometry being rendered) are actually passed.

In some implementations, the two passes of the cut-out shader-related technique described above are initiated by the driver 122 (or other software module), which sends the geometry into the APD 116 for rendering twice, each time with state that sets the APD 116 according to the settings described above (where the settings include which z-test block (early-z or late-z) is used, which pixel shader is used, and other settings). In some implementations, the early-z block is the same physical block as the late-z block. The difference is simply in when the block is invoked (i.e., pre- or post- pixel shader).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing graphics primitives, the method comprising:
   receiving, at a binner, a set of primitives to render using a pixel shader program that includes cut-out functionality, the primitives being received from a world-space pipeline;
   transmitting, by the binner, the set of primitives to at least a part of a screen-space portion of a graphics processing pipeline for processing in a first pass that includes:
      processing the set of primitives with a reduced version of the pixel shader program including instructions that discard fragments per the cut-out functionality but that omit at least one instruction of the pixel shader program; and
      processing the first set of fragments by a late-z depth test block of the screen-space portion to generate depth test results; and
   transmitting, by the binner, the set of primitives to the screen-space portion of the graphics processing pipeline for a second pass that includes:
      discarding, by an early-z depth test block, fragments from the second set of fragments based on the depth test results generated in the first pass to generate remaining fragments; and
      processing the remaining fragments by the pixel shader program that includes the at least one instruction omitted in the first pass.

2. The method of claim 1, wherein processing the set of primitives comprises sorting the primitives based on depth.

3. The method of claim 2, further comprising:
   sorting the primitives based on depth by assigning each primitive of the primitives to one of a plurality of depth bins based on the depths of the primitives, each depth bin having a range of depths; and
   processing the fragments generated based on the set of primitives in a pixel shader by transmitting the set of primitives to a screen-space pipeline that includes the pixel shader according to the depth bins to which the primitives of the set of primitives are assigned.

4. The method of claim 2, further comprising:
   spatially sorting the primitives.

5. The method of claim 1, wherein the transmitting of the set of primitives is performed in response to determining that the set of primitives does not use blending.

6. The method of claim 1, wherein a buffer in the binner stores the set of primitives for retransmission in the second pass.

7. The method of claim 6, further comprising, spatially binning the set of primitives for processing in the second pass.

8. The method of claim 1, wherein generating the first set of fragments and generating the second set of fragments are performed by a rasterizer.

9. The method of claim 1, wherein the at least one instruction that is omitted in the first pass comprises an instruction that modifies color of fragments.

10. The method of claim 1, wherein processing the remining fragments in the second pass includes processing the remaining fragments with a version of the pixel shader program that does not include the instructions that discard fragments per the cut-out functionality.

11. The method of claim 1, wherein discarding the fragments by the early-z depth test block comprises perform an equals depth test.

12. The method of claim 11, wherein the equals depth test comprises a depth test in which fragments are passed in the situation that depths of the fragments are equal to depth values stored in a depth buffer for screen positions of the fragments, and fragments are not passed in the situation that depths of the fragments are not equal to depth values stored in the depth buffer for screen positions of the fragments.

13. A system for processing graphics primitives, the system comprising:
  a graphics processing pipeline configured to:
  receive, at a binner, a set of primitives to render using a pixel shader program that includes cut-out functionality, the primitives being received from a world-space pipeline;
  transmit, by the binner, the set of primitives to at least a part of a screen-space portion of a graphics processing pipeline for processing in a first pass that includes:
    processing the set of primitives with a reduced version of the pixel shader program including instructions that discard fragments per the cut-out functionality but that omit at least one instruction of the pixel shader program; and
    processing the first set of fragments by a late-z depth test block of the screen-space portion to generate depth test results;
  transmit, by the binner, the set of primitives to the screen-space portion of the graphics processing pipeline for a second pass that includes:
    discarding, by an early-z depth test block, fragments from the second set of fragments based on the depth test results generated in the first pass to generate remaining fragments; and
    processing the remaining fragments by the pixel shader program that includes the at least one instruction omitted in the first pass.

14. The system of claim 13, wherein the graphics processing pipeline further comprises:
  a binner configured to process the set of primitives by sorting the primitives based on depth, wherein sorting the primitives based on depth comprises assigning each primitive of the primitives to one of a plurality of depth bins based on the depths of the primitives, each depth bin having a range of depths; and
  the graphics processing pipeline is further configured to process the fragments generated based on the set of primitives in a pixel shader by transmitting the set of primitives to a screen-space pipeline by the binner, the screen-space pipeline including the pixel shader, the order of transmitting being according to the depth bins to which the primitives of the set of primitives are assigned.

15. The system of claim 14, wherein the binner is further configured to spatially sort the primitives before transmitting the primitives to the screen-sp ace pipeline.

16. The system of claim 13, wherein the graphics processing pipeline further comprises:
  a binner configured to buffer the primitives for reprocessing in the second pass.

17. The system of claim 13, wherein generating the first set of fragments and generating the second set of fragments are performed by a rasterizer.

18. The system of claim 13, wherein the at least one instruction that is omitted in the first pass comprises an instruction that modifies color of fragments.

19. The system of claim 13, wherein processing the remining fragments in the second pass includes processing the remaining fragments with a version of the pixel shader program that does not include the instructions that discard fragments per the cut-out functionality.

20. The system of claim 13, wherein discarding the fragments by the early-z depth test block comprises perform an equals depth test.

* * * * *